(12) United States Patent
Mackin et al.

(10) Patent No.: US 10,914,311 B2
(45) Date of Patent: Feb. 9, 2021

(54) POWERED PRE-COOLER FAN ASSEMBLY

(71) Applicant: The Boeing Company, Chicago, IL (US)

(72) Inventors: Steve G. Mackin, Bellevue, WA (US); Abhishek Sahay, Everett, WA (US)

(*) Notice: Subject to any disclaimer, the term of this patent is extended or adjusted under 35 U.S.C. 154(b) by 209 days.

(21) Appl. No.: 16/039,489

(22) Filed: Jul. 19, 2018

(65) Prior Publication Data

US 2020/0025207 A1 Jan. 23, 2020

(51) Int. Cl.
*F04D 27/00* (2006.01)
*F04D 25/06* (2006.01)
*F04D 25/08* (2006.01)
*F04D 29/56* (2006.01)
*B64D 13/06* (2006.01)

(52) U.S. Cl.
CPC .......... *F04D 27/002* (2013.01); *F04D 25/06* (2013.01); *F04D 25/08* (2013.01); *F04D 27/004* (2013.01); *F04D 29/563* (2013.01); *B64D 2013/0644* (2013.01); *F05D 2220/323* (2013.01)

(58) Field of Classification Search
CPC .............. B64D 13/06; B64D 13/08; B64D 2013/0603; F04D 27/00; F04D 27/002; F04D 27/003; F04D 27/004; F04D 29/582; F04D 29/5826; F04D 29/5833; F04D 25/04; F04D 25/045; F04D 25/06; F04D 25/08
See application file for complete search history.

(56) References Cited

U.S. PATENT DOCUMENTS

| | | | | |
|---|---|---|---|---|
| 2,144,035 | A * | 1/1939 | Smith, Jr. | F04D 29/545 415/148 |
| 8,622,695 | B2 * | 1/2014 | Decker | F04D 29/541 415/214.1 |
| 2015/0292352 | A1 | 10/2015 | Marche | |
| 2015/0292410 | A1 * | 10/2015 | Suciu | F02C 7/18 60/39.15 |

FOREIGN PATENT DOCUMENTS

| | | |
|---|---|---|
| EP | 2584169 A2 | 4/2013 |
| EP | 2944794 A1 | 11/2015 |
| GB | 2437295 A | 10/2007 |

* cited by examiner

*Primary Examiner* — Richard A Edgar
(74) *Attorney, Agent, or Firm* — Felix L. Fischer

(57) ABSTRACT

A pre-cooler system employs a powered pre-cooler fan assembly having a fan adapted to receive bypass engine fan air through an inlet plenum with an outlet guide vane array (OGVA) adapted to control airflow from the inlet plenum and fan, with a rotational power source operationally connected to the fan. A shroud directs airflow from the inlet plenum, fan and OGVA into a pre-cooler disposed downstream of the fan and OGVA.

20 Claims, 15 Drawing Sheets

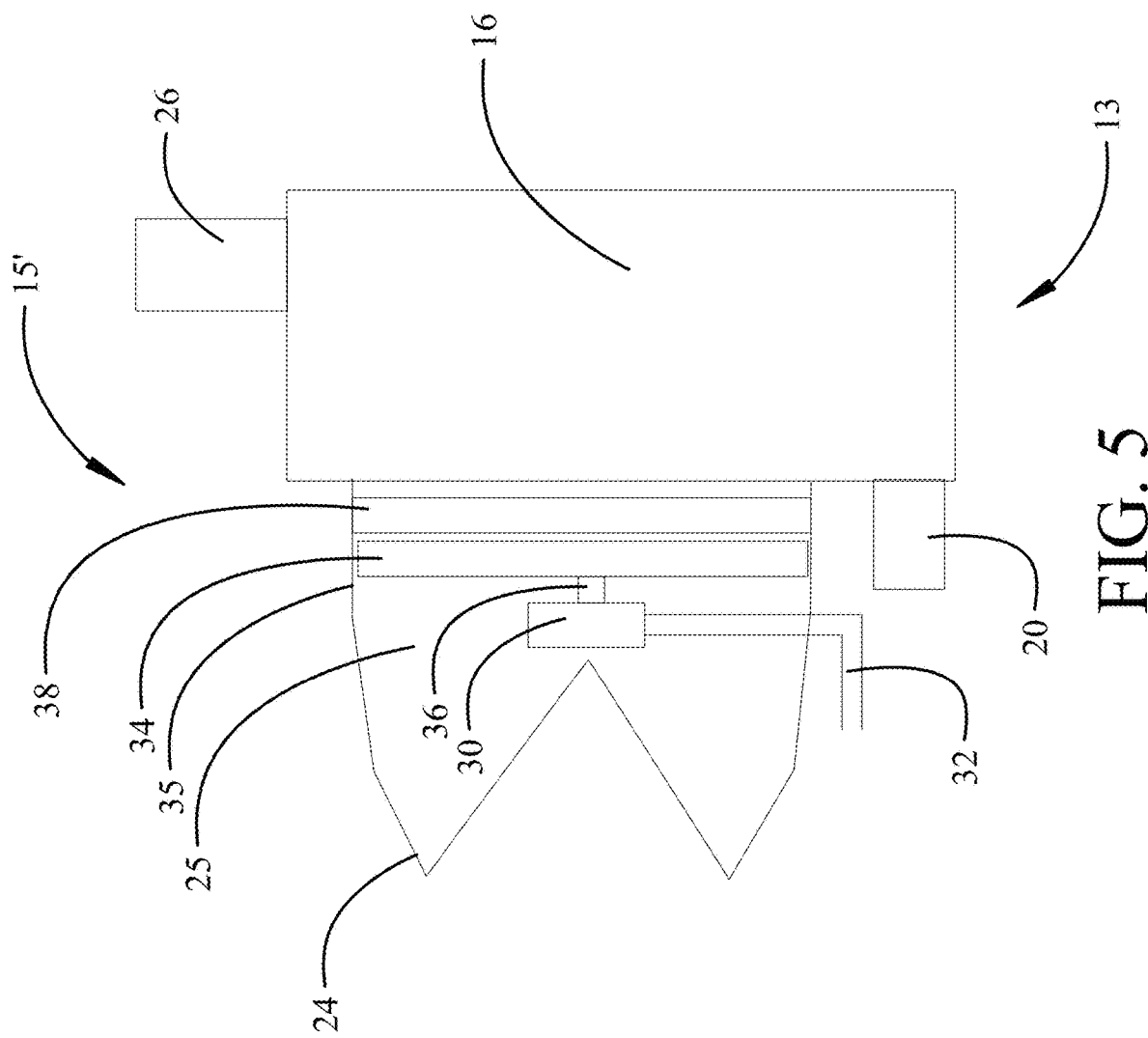

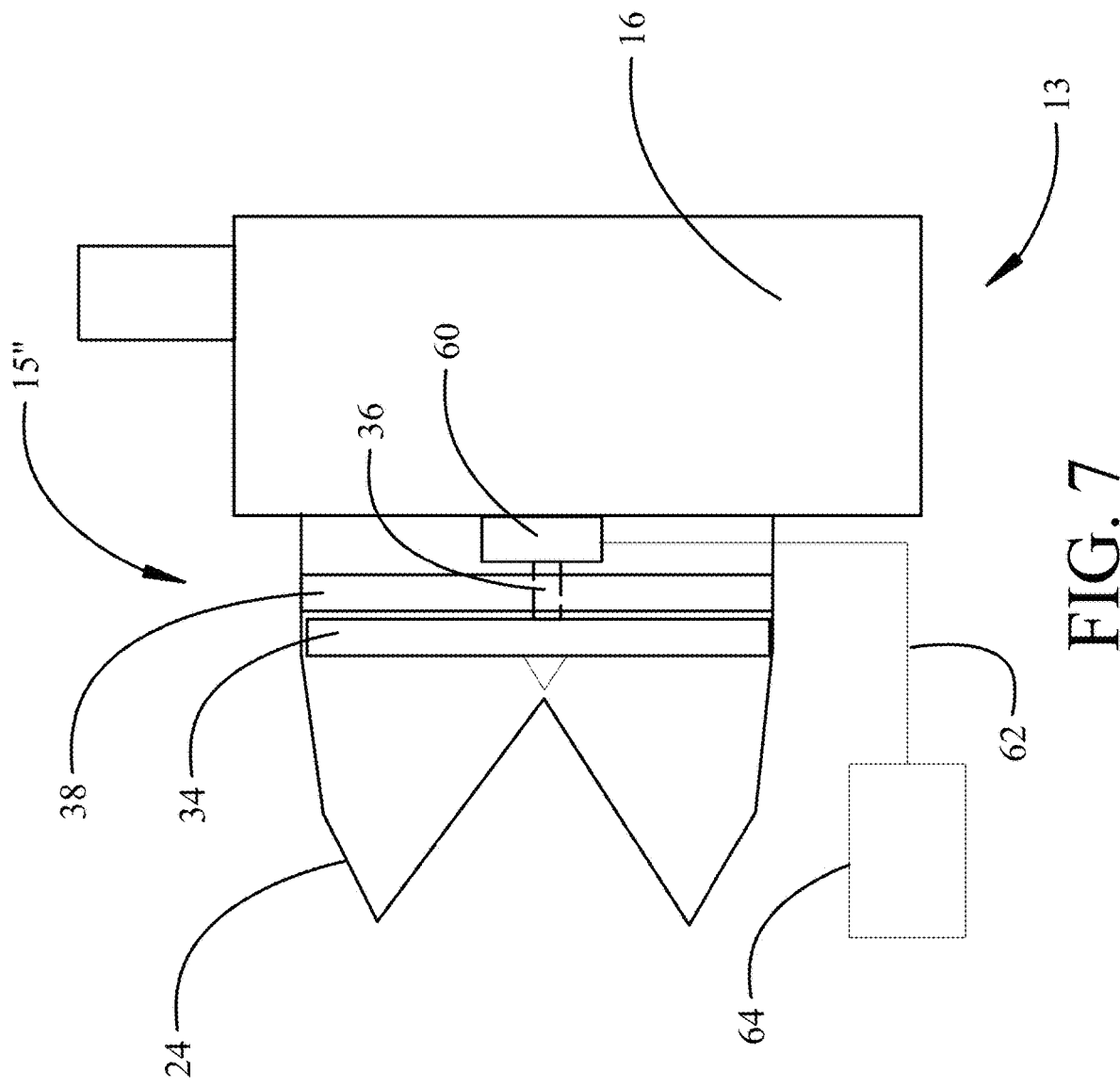

POWERED PRE-COOLER FAN ASSEMBLY

BACKGROUND INFORMATION

Field

Implementations of the disclosure relate generally to the field of fan air supplemental power for aircraft environmental control pre-cooler systems and more particularly a single stage fan with variable exit guide vanes driven by a small pneumatic turbine or electric motor for boosting fan flow to a pre-cooler.

Background

Large commercial aircraft employ an environmental control system (ECS) for cabin air pressure and temperature that relies on bleed air from the engine compressor section. In aircraft with turbofan engines the compressor bleed air is cooled by a heat exchanger, identified in the art as a pre-cooler, with diverted fan bypass air flow and is then routed to the ECS system and any other systems that use the bleed air. In modern high bypass turbofan engines, pre-coolers are becoming larger and larger due to ECS flow requirements and reduction in jet engine fan pressure ratio. The space available for the pre-cooler is tight and the length available for the pre-cooler inlet may be too short to assure even flow distribution. If the flow is not evenly distributed, the pre-cooler thermal performance may not be adequate and the pre-cooler life may be impacted due to thermal stresses. In the case of volume constrained engine installations, integration of pre-coolers is increasingly challenging with very low pressure ratio fans. High bypass ratio engines do not create the pressure required for pre-coolers and the heat rejection demand is increasing with increased bypass ratio and fan diameter. Downstream fan duct losses which may further degrade the pre-cooler efficiency are also not desirable. Increasing the engine length as a solution to accommodate both size and flow constraints, adds a significant amount of weight to the aircraft and may not be possible due to rotor dynamics issues.

SUMMARY

Implementations disclosed herein provide a pre-cooler system employing a powered pre-cooler fan assembly having a fan adapted to receive bypass engine fan air through an inlet plenum and an outlet guide vane array (OGVA) adapted to control airflow from the inlet plenum and fan, with a rotational power source operationally connected to the fan. A shroud directs airflow from the inlet plenum, fan and OGVA and a pre-cooler is disposed downstream of the fan and OGVA and receives airflow from the shroud.

The implementations disclosed provide a method for enhancing operation of a pre-cooler by providing a fan with a rotational power source driving the fan and an outlet guide vane array (OGVA) having variable guide vanes intermediate an inlet plenum and the pre-cooler. Temperature of outlet air from the pre-cooler is sensed and a temperature signal is provided to a controller. In a first mode of operation, the OGVA is controlled responsive to the temperature signal and in a second mode of operation speed of the fan is controlled responsive to the temperature signal.

BRIEF DESCRIPTION OF THE DRAWINGS

The features, functions, and advantages of the powered pre-cooler fan assembly can be achieved independently in various implementations of the present disclosure or may be combined in yet other implementations further details of which can be seen with reference to the following description and drawings.

FIG. 5 is a block diagram of a second configuration of the powered pre-cooler fan assembly;

FIG. 7 is a block diagram of a third configuration of the powered pre-cooler fan assembly;

DETAILED DESCRIPTION

Implementations disclosed herein provide a pre-cooler system employing a powered pre-cooler fan assembly having a single stage fan adapted to receive bypass engine fan air through an inlet plenum. A rotational power source, such as a small pneumatic turbine or an electric motor, is operationally connected to drive the fan. For the implementations disclosed the fan is an axial flow fan. An outlet guide vane array (OGVA) having variable guide vanes is adapted to control airflow from the inlet plenum and fan. A shroud interconnecting the inlet plenum and pre-cooler is adapted to direct airflow from the inlet plenum, fan and OGVA into the pre-cooler. The pressurized inlet flow for the pneumatic turbine is supplied by a dedicated pneumatic line and the pneumatic turbine exhaust (which can be very cold after expansion) is discharged either upstream or downstream of the fan into the pre-cooler. The variable exit guide vanes are dual use. When the fan is not operating (likely wind milling) the variable guide vanes in the OGVA can be used to throttle air into the pre-cooler. This performs the function of prior art fan air modulating valves. When the fan is powered the variable guide vanes remove swirl from the fan and diffuse the air slightly to optimize pre-cooler inlet flow.

Figure 1:
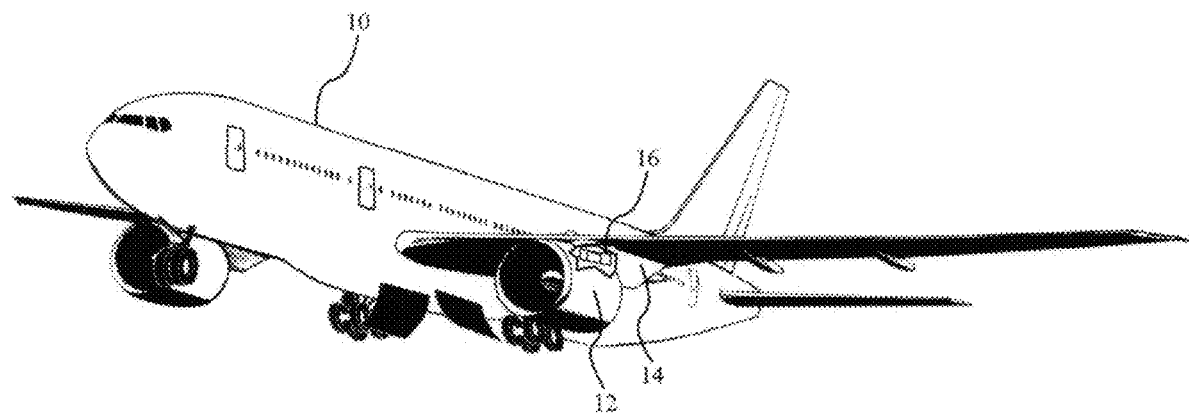
FIG. 1 is pictorial view of a commercial aircraft showing the placement of implementations for a powered pre-cooler fan assembly disclosed herein.
Figure 2:
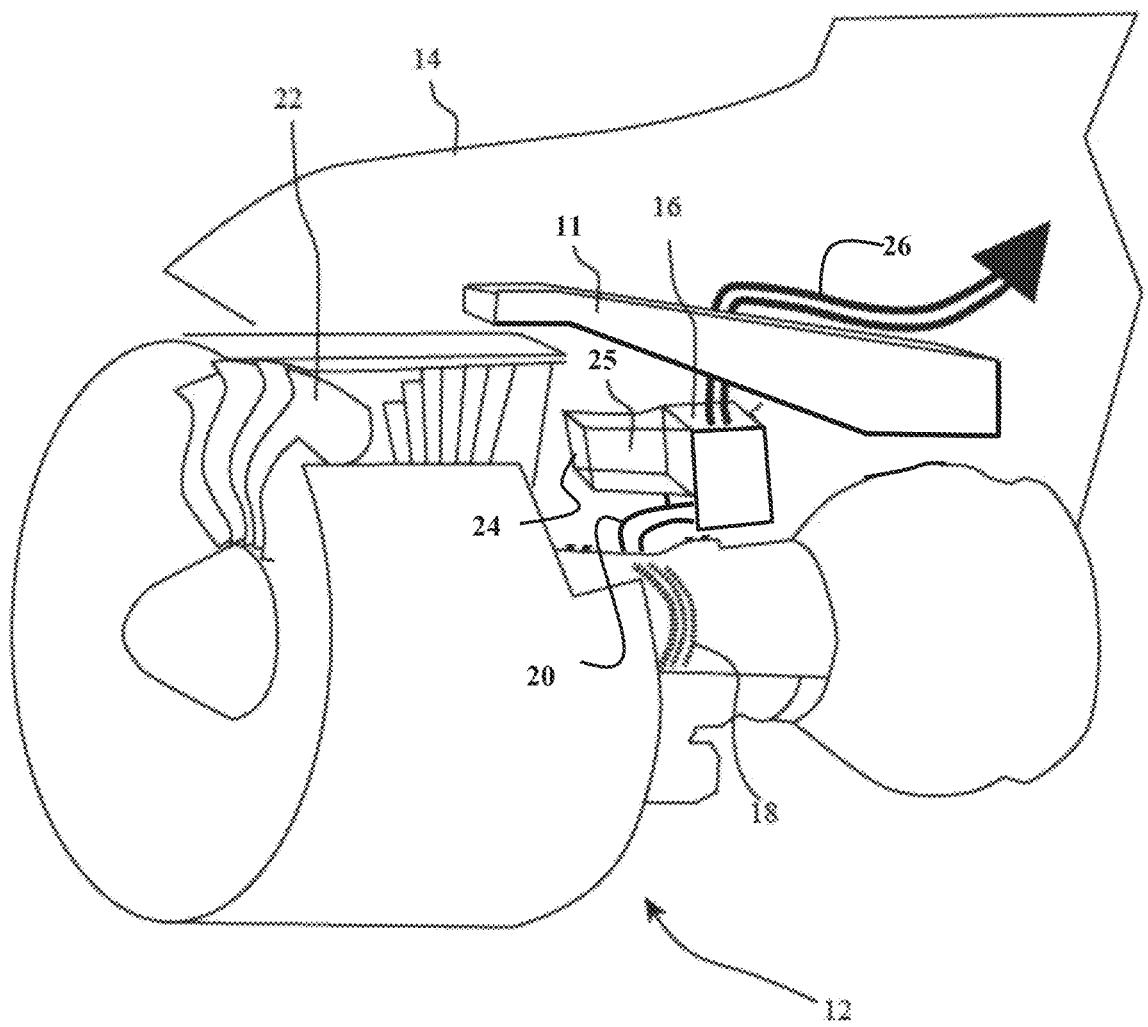
FIG. 2 is a pictorial side view of the installation of the implementations disclosed herein with reference to a turbofan engine and support structure.

Referring to the drawings, FIG. 1 shows a commercial aircraft 10 having engines 12 mounted to the wing via a structural strut 11 (shown in detail in FIG. 2) which is enclosed in a strut fairing 14. A pre-cooler 16 is mounted below the strut 11 and within the strut fairing 14. Referring to FIG. 2, the pre-cooler 16 receives bleed air flow from a compressor section 18 of the engine through one or more conduits 20 as a supply for an internal heat exchanger. Cooling flow for heat exchange in the pre-cooler 16 is extracted from bypass flow in the engine fan 22 and provided to the pre-cooler through a pre-cooler inlet 24 forming an inlet plenum 25. The precooled air is then provided to the ECS through one or more pre-cooler outlets represented by arrow 26. While described in the implementations as a pre-cooler for air conditioning systems, the implementations may be employed in similar fan bypass air coolers for oil cooling or other applications for fan bypass air cooled devices.

For a multiengine aircraft, a similar system as that described with respect to FIG. 2 may be present for each or one of the additional engines connecting into a manifold through appropriate valving.

Figure 3:
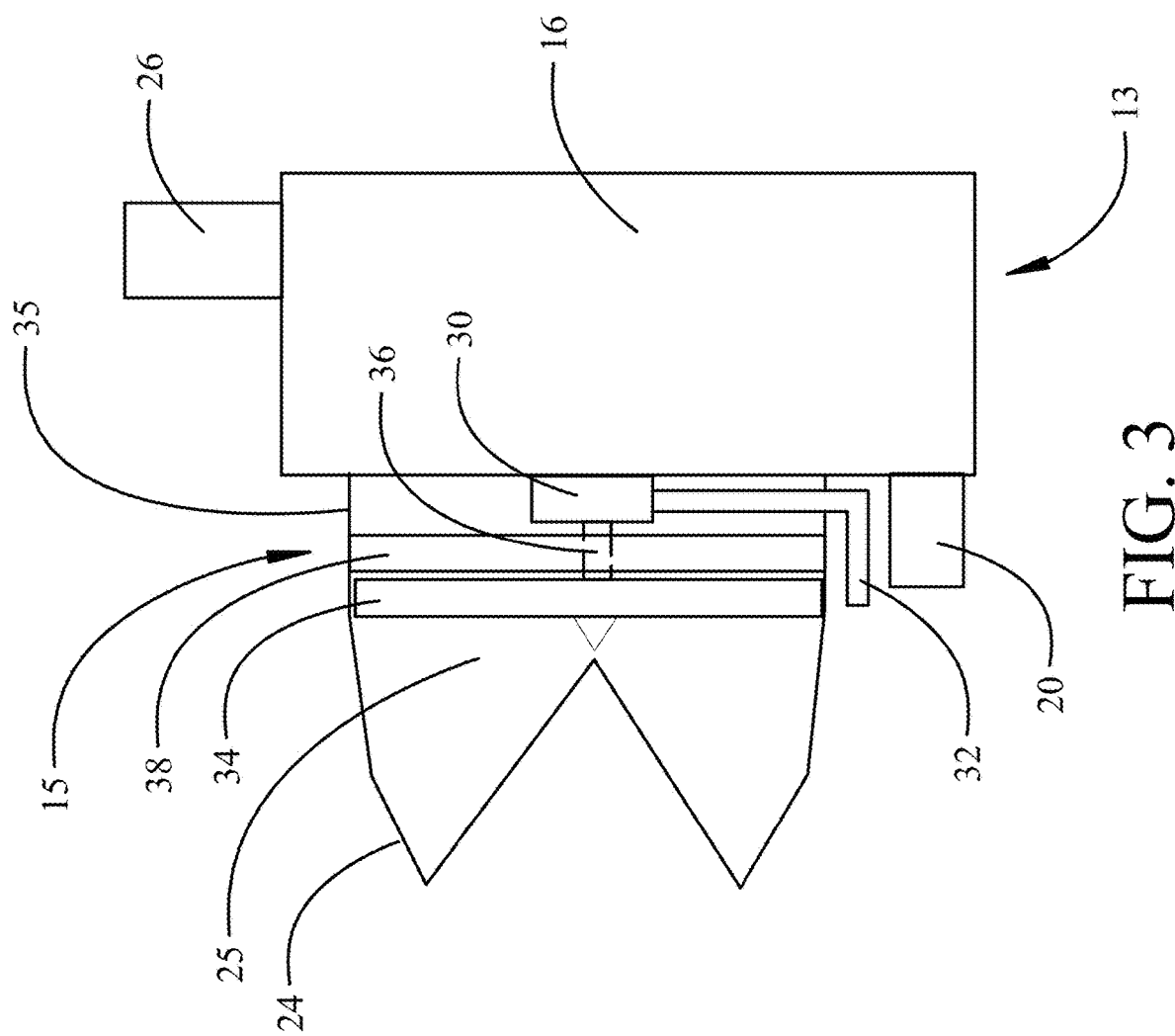
FIG. 3 is a block diagram of a first configuration of the powered pre-cooler fan assembly.

To achieve desired operational capability of a pre-cooler 16 in an aircraft having a modern high bypass ratio engine, a pre-cooler system 13 having a powered pre-cooler fan assembly 15 in conjunction with the pre-cooler 16 and the associated inlet 24 is employed. A block diagram of a first configuration of a powered pre-cooler fan assembly 15 for use in the pre-cooler system 13 is shown in FIG. 3. A pneumatic turbine 30, acting as the rotational power source, is powered by pressurized airflow received from the compressor section 18 of the engine 12 via a pneumatic pressure supply line 32. A multi-bladed single stage fan 34 housed in a duct or shroud 35 providing a flow path from the inlet plenum 25 is driven by the pneumatic turbine 30 through a shaft 36. The fan 34 is adapted to increase flow rate and pressure for air drawn through inlet plenum 25 out of the bypass flow from the engine fan section 22 as previously described. An outlet guide vane array 38 (OGVA), with a plurality of variable guide vanes 39 (as seen in FIGS. 4A-4D), is positioned downstream of the fan 34 and adapted to guide and control the air flow through the shroud 35 connecting the inlet plenum 25 to the pre-cooler 16 disposed downstream of the fan 34. The variable guide vanes 39 are adjustable through a range of positions from an open position allowing the OGVA 38 to remove swirl from the fan 34 to a closed position to throttle flow through the shroud 35 into the pre-cooler 16 when the fan 34 is not operating. For the implementation shown, the pneumatic turbine is positioned downstream of the fan and OGVA.

Figure 4A:
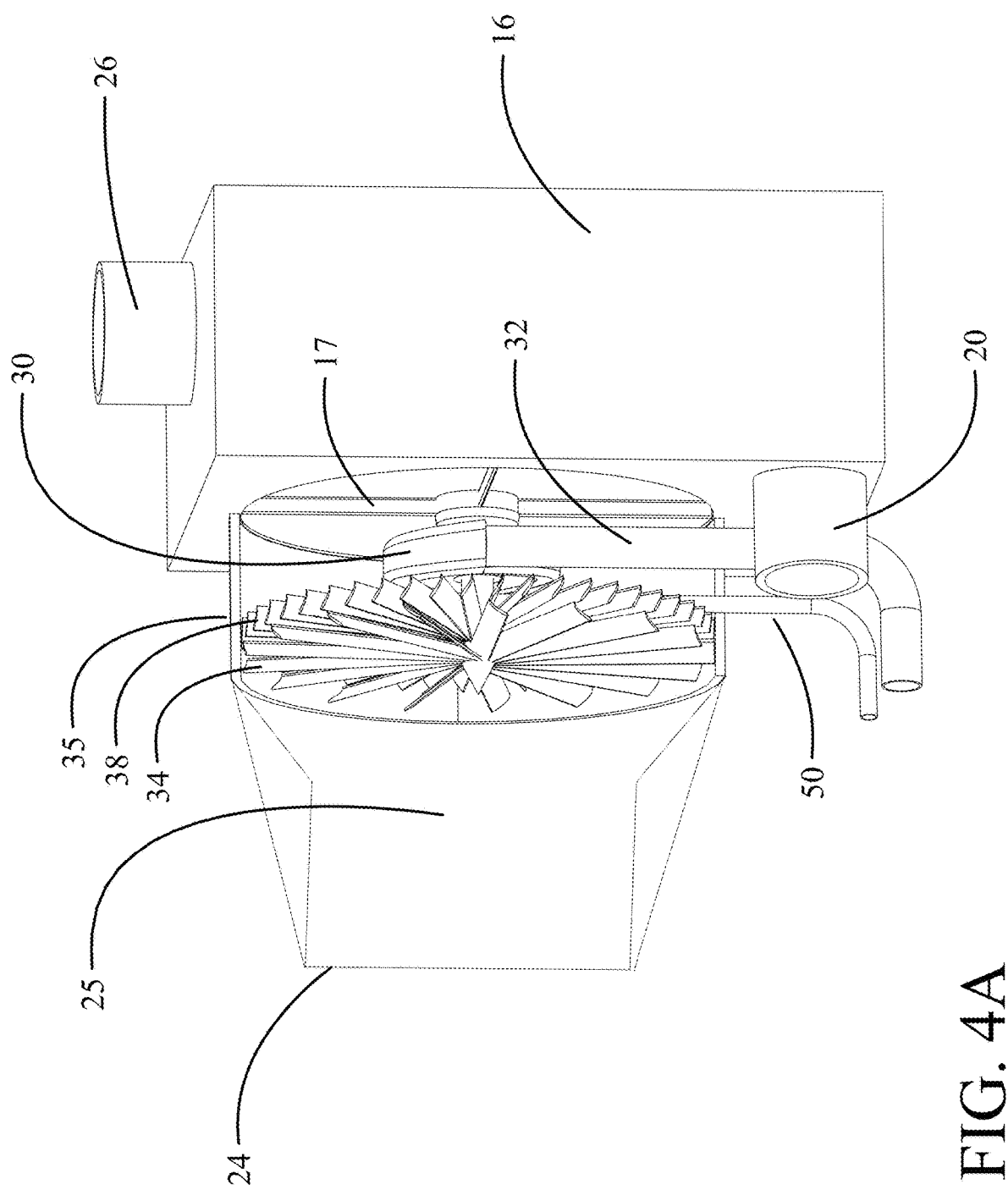
FIG. 4A is a pictorial representation of an exemplary implementation of the first configuration.
Figure 4B:
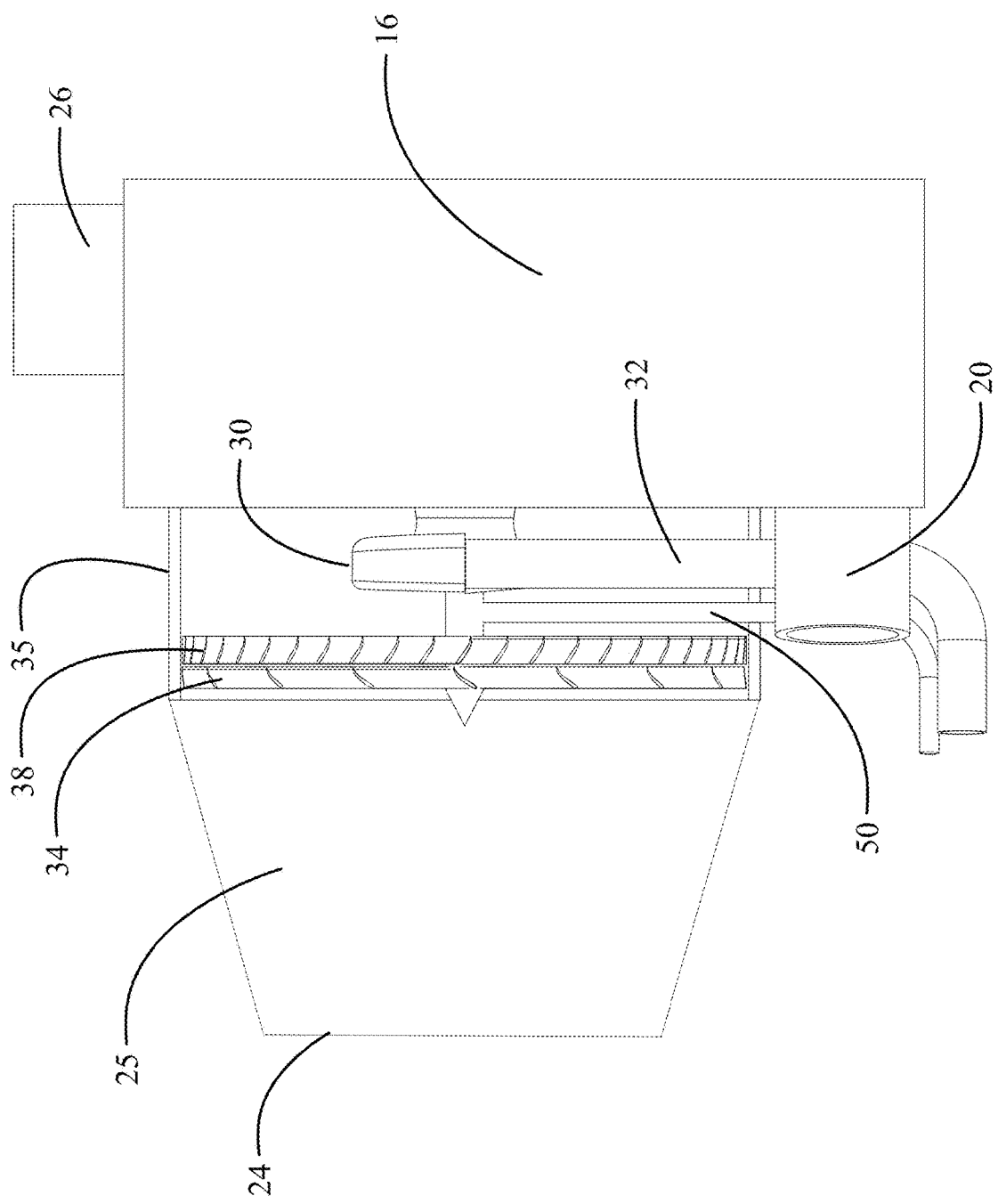
FIG. 4B is side view of the implementation of FIG. 4A with a partial section of the inlet and shroud to expose the fan, outlet guide vane array and turbine.
Figure 4C:
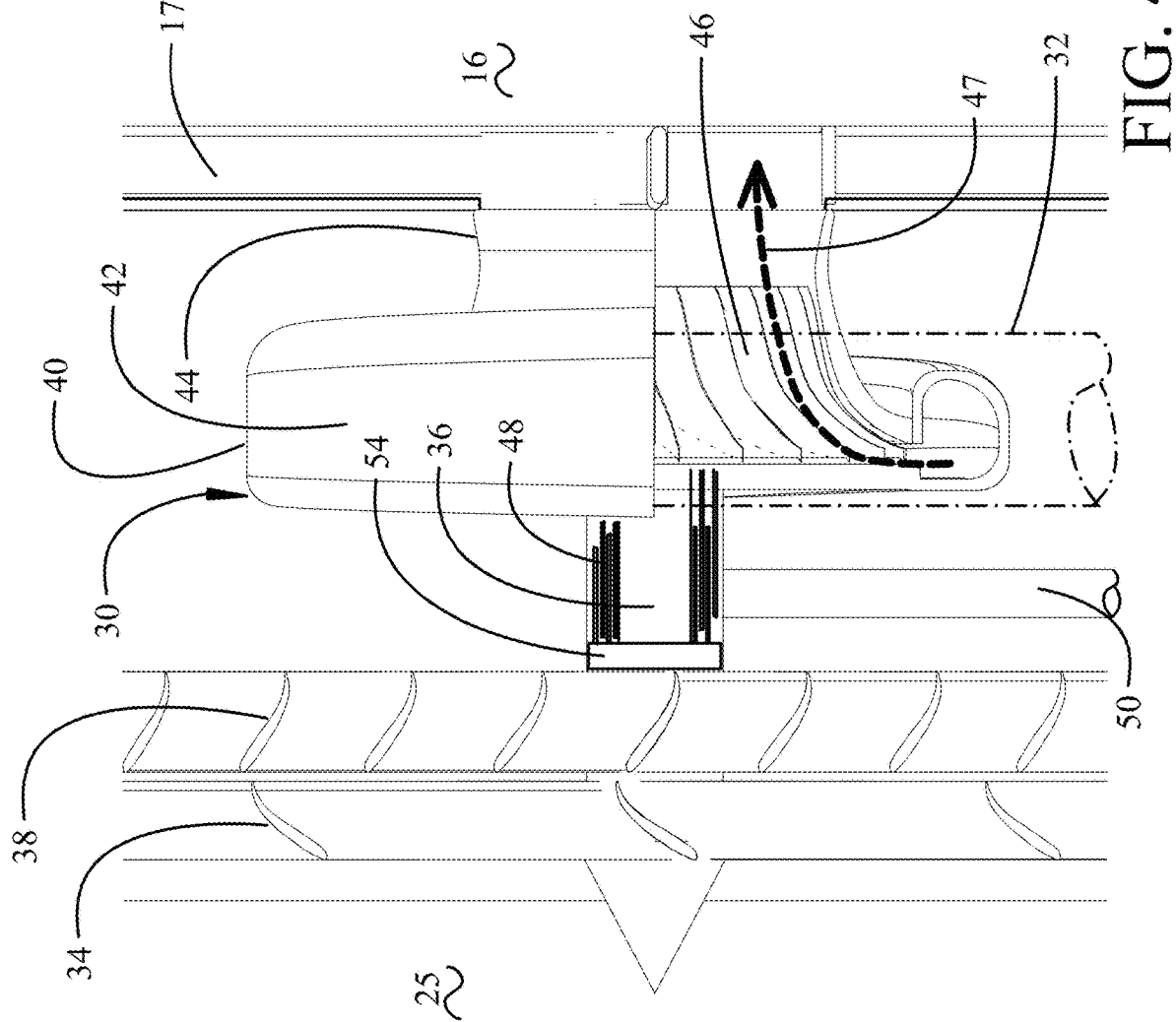
FIG. 4C is a detailed side view of the implementation of FIG. 4A with additional section of the turbine and shaft with the pneumatic supply line shown in phantom.
Figure 4D:
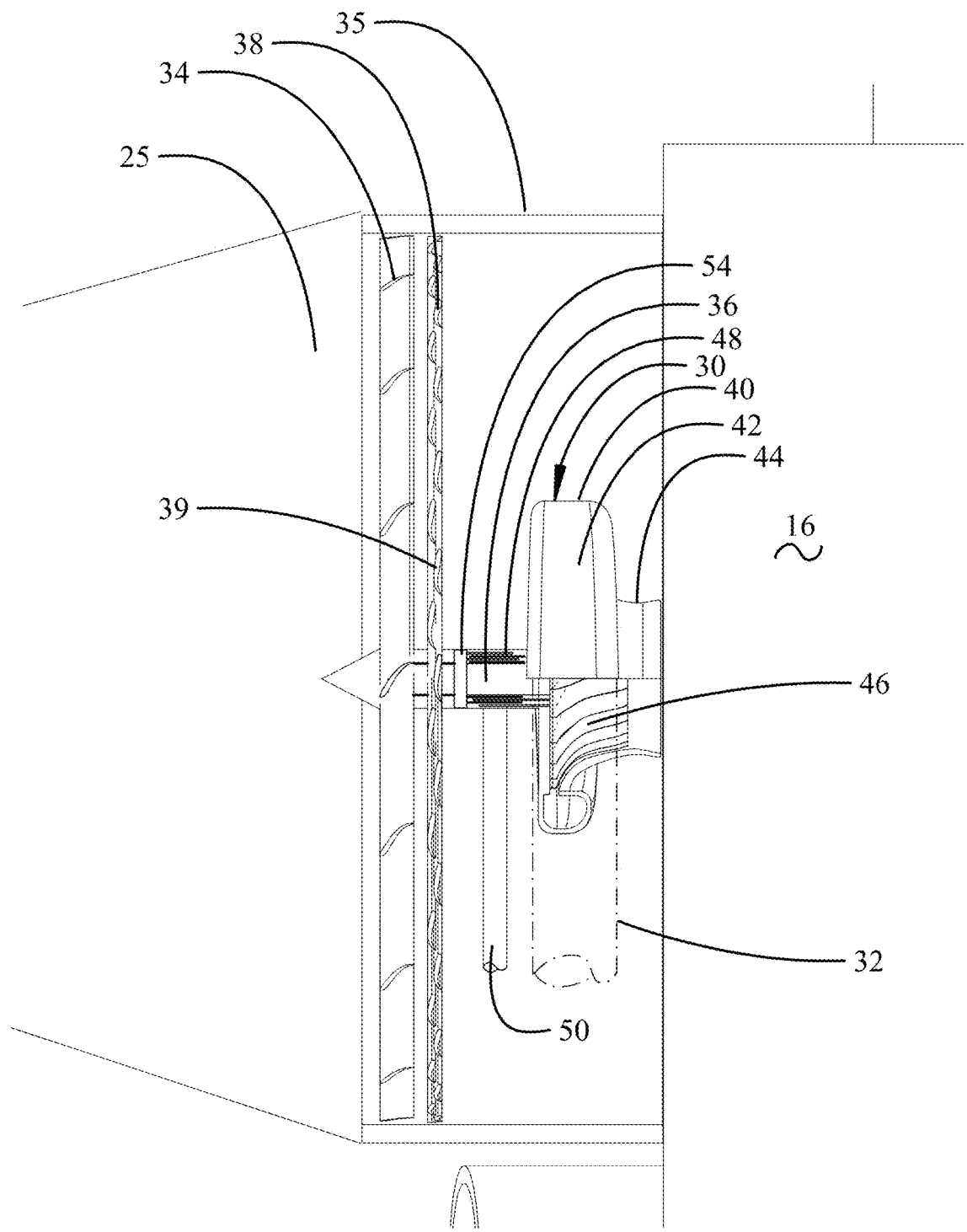
FIG. 4D is a side section view of the implementation of FIG. 4A showing the vanes of the outlet guide vane array in a closed position.

A notional implementation for the configuration of FIG. 3 is shown in general in FIGS. 4A and 4B and in detail in FIGS. 4C and 4D. Pneumatic turbine 30 is a radial inflow turbine having a case 40 with an inlet volute 42 and an outlet diffuser 44 (best seen in FIG. 4C). High pressure inlet air from the pneumatic pressure supply line 32 (shown in phantom in FIG. 4C for clarity) is received in the volute 42 and expands through a turbine wheel 46 into diffuser 44 (as represented by arrow 47). Connection of the turbine wheel 46 through a shaft 36 to the fan 34 provides rotational power to the fan. For the implementation shown, the turbine case 40 may be structurally supported by interconnection of the outlet diffuser 44 and forward surface structure 17 of the pre-cooler 16. Brackets or other support from the turbine case 40 to the shroud 35 or other pre-cooler structure may alternatively or additionally be provided.

The outlet flow from the turbine 30 is provided through outlet diffuser 44 which entrains flow into the pre-cooler 16 with the flow from fan 34 through the shroud 35. Work extracted by the turbine wheel 46 with further expansion by the outlet diffuser 44 may provide additional cooling creating a cold flow stream in the outlet diffuser. As seen in FIG. 4C, shaft 36 may be supported by air bearings 48. Supply air for the air bearings 48 may be provided through a supply line 50 which may include an air cooler 52 (seen and described with respect to FIG. 8A below) if required. The supply air may also be extracted from the compressor section 18. A thrust bearing 54 is provided to react thrust forces between the turbine wheel 46 and the fan 34.

As seen in FIGS. 4A, 4B and 4C, the OGVA 38 in an open position directs flow from the fan 34 into the pre-cooler 16, removing swirl in the flow. As seen in FIG. 4D, the vanes 39 in the OGVA 38 may be positioned to throttle flow from the inlet into the pre-cooler 16. The vanes 39 may be tapered or offset, or both, to allow rotation placing the OGVA 38 in a closed position as shown.

A block diagram of a second configuration of a powered pre-cooler fan assembly 15' for incorporation in the pre-cooler system 13 is shown in FIG. 5. As in the prior embodiment, a pneumatic turbine 30 is powered by a pneumatic pressure supply line 32 receiving pressurized flow from the compressor section 18 of the engine 12. Multibladed fan 34 is housed aft of the pneumatic turbine 30 in the shroud 35 and driven by the pneumatic turbine 30 through a shaft 36. Outlet guide vane array 38 (OGVA), with vanes 39 (seen in FIGS. 6A, 6B) having a variable angle of incidence, is positioned downstream of the fan 34 and adapted to guide the air flow through the shroud 35 connecting the inlet plenum 25 to the pre-cooler 16 disposed downstream of the fan 34. As in the first configuration, the vanes 39 are adjustable through a range of positions from an open position allowing the OGVA 38 to remove swirl from the fan 34 to a closed position to throttle flow through the shroud 35 into the pre-cooler 16 when the fan 34 is not operating.

Figure 6A:
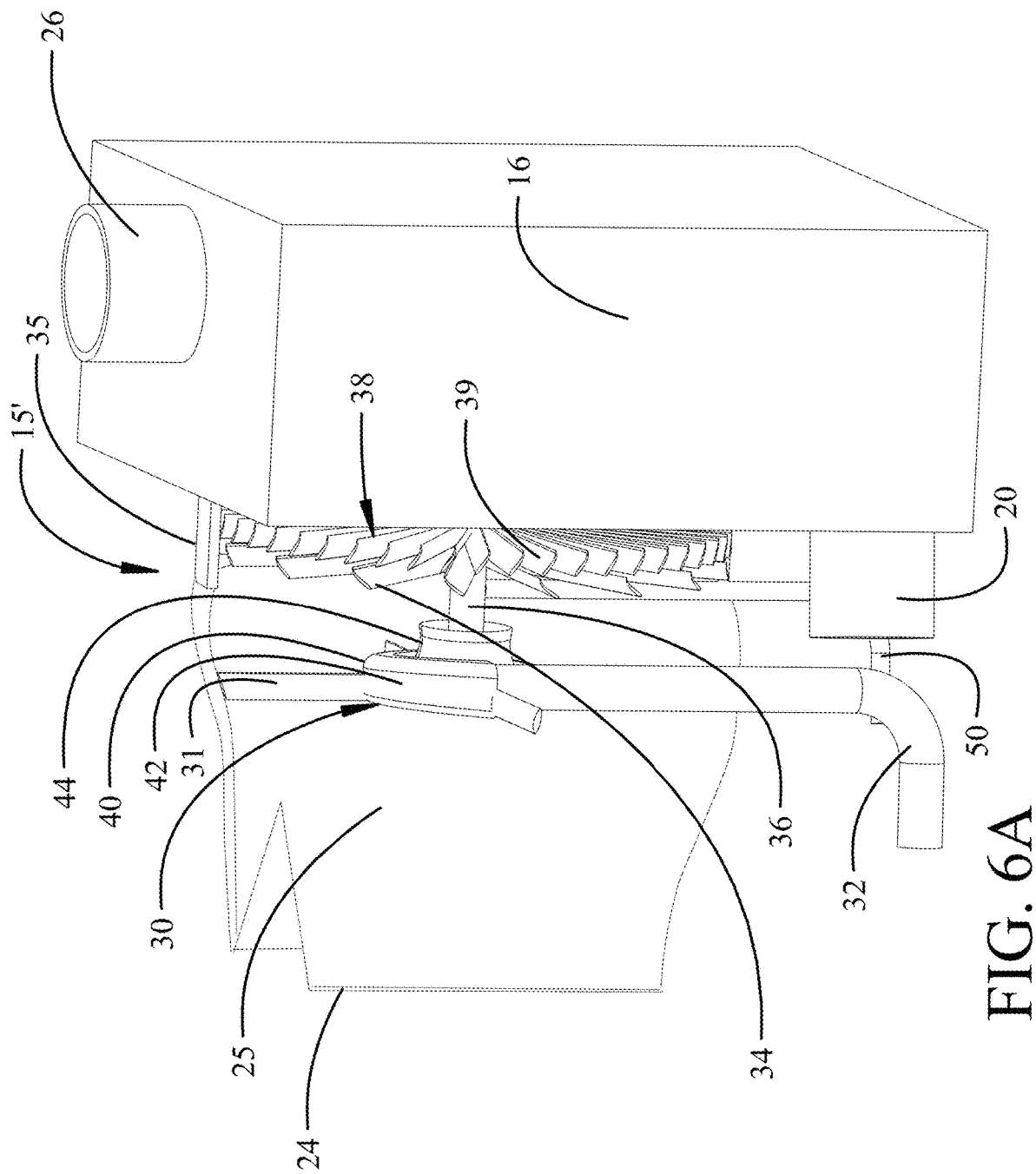
FIG. 6A is a pictorial representation of an exemplary implementation of the second configuration.
Figure 6B:
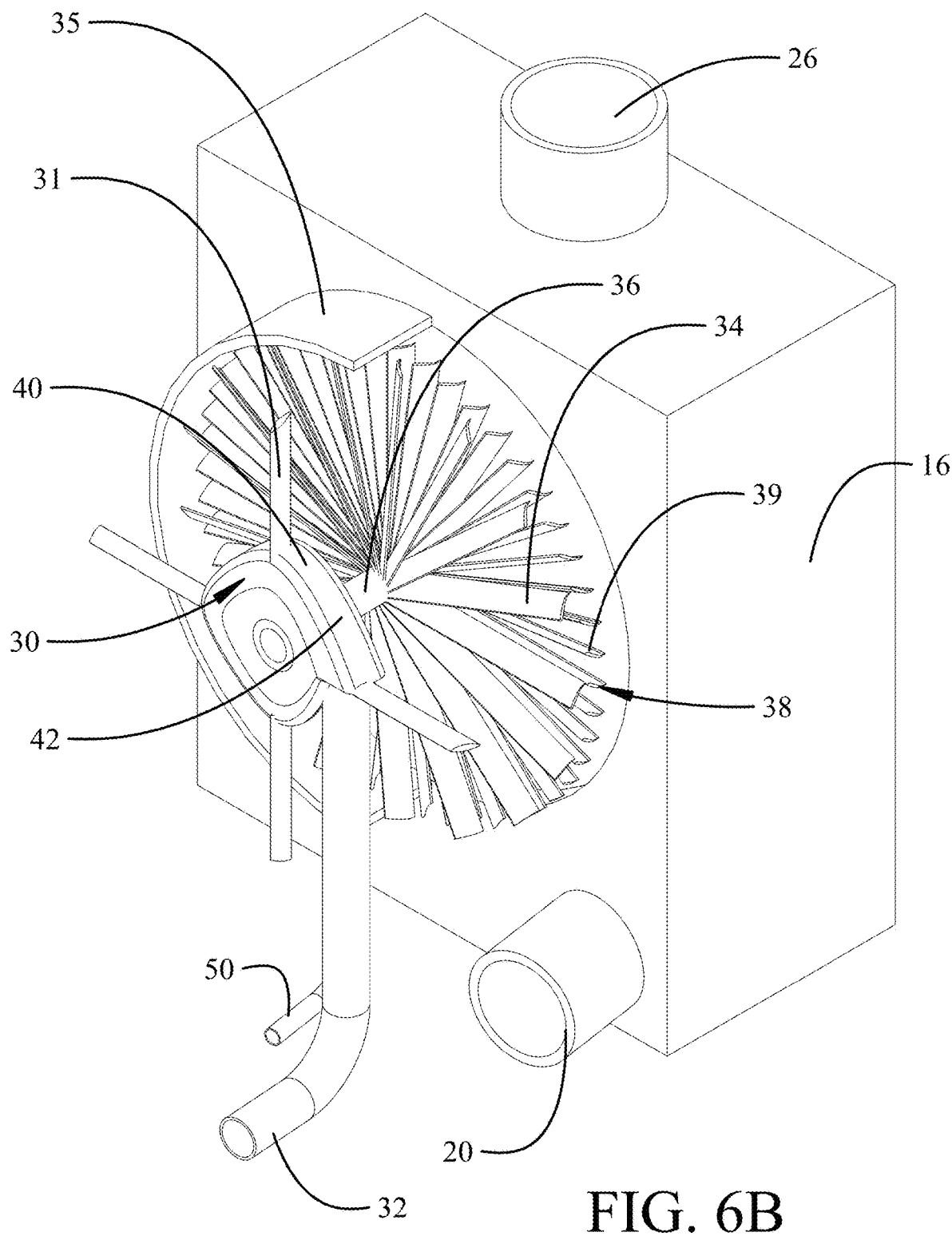
FIG. 6B is a pictorial representation of the second configuration as shown in FIG. 6A from and opposing angle with the forward portions of the inlet and shroud removed for clarity.
Figure 6C:
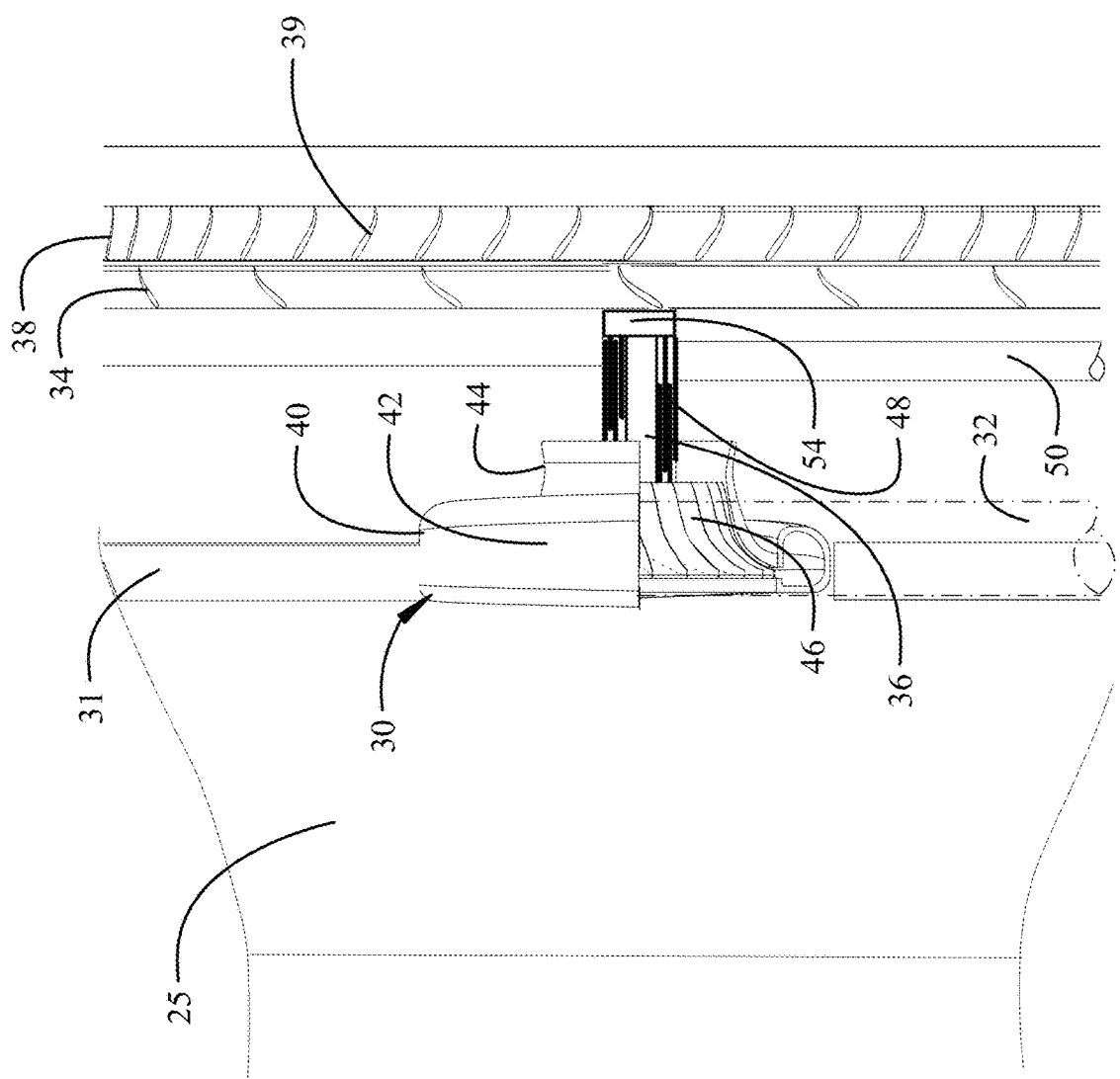
FIG. 6C is a detailed side view of the implementation of FIG. 6A.

A notional implementation for the configuration of FIG. 5 is shown in general in FIGS. 6A and 6B (with the forward portions of the shroud and inlet removed for clarity) and in detail in FIG. 6C. As in the previously described implementation, pneumatic turbine 30 is a radial inflow turbine having a case 40 with an inlet volute 42 and an outlet diffuser 44. Mounting of the pneumatic turbine 30 is accomplished with struts 31 extending from the turbine case 40 to the shroud 35 or other structure of the inlet 24. High pressure inlet air from the pneumatic pressure supply line 32 (shown in phantom in FIG. 6C for clarity) is received in the volute 42 and expands through a turbine wheel 46 into diffuser 44 which provides rotational power through shaft 36 to the fan 34. As in the prior implementation and seen in FIG. 6B, shaft 36 may be supported by air bearings 48. Supply air for the air bearings 48 may be provided through a supply line 50. The supply air may also be extracted from the compressor section 18. A thrust bearing 54 is provided to react thrust forces between the turbine wheel 46 and the fan 34.

The outlet flow from the turbine 30 is provided through outlet diffuser 44 and entrained into the flowpath prior to the fan 34 and may provide additional cooling due to expansion of the pneumatic flow and extraction of work by the turbine wheel 46 creating a cold flow stream in the outlet diffuser. While the diffuser is shown as having axial flow in the implementation a radial flow diffuser or segmentation of the diffuser to provide an outlet for the expanded flow over a larger area within the shroud 35 may be employed.

In a third configuration of a powered pre-cooler fan assembly 15", the rotational power source may be an electric motor 60 as shown in FIG. 7. The configuration of the fan 34 and OGVA 38 for operation of implementations of the third configuration is substantially identical to the first and second configurations with electrical power to the electric motor 60 replacing pneumatic pressure to the turbine 30. Power supplied from an electrical source through cabling 62 either directly or through a variable power relay 64 powers the electrical motor 60 for operation the fan 34 through shaft 36.

The first, second and third configurations described and shown in the drawings place the OGVA 38 downstream of the fan 34. The OGVA 38 may alternatively be placed upstream of the fan 34 controlling flow intermediate the inlet plenum 25 and the fan 34.

Figure 8A:
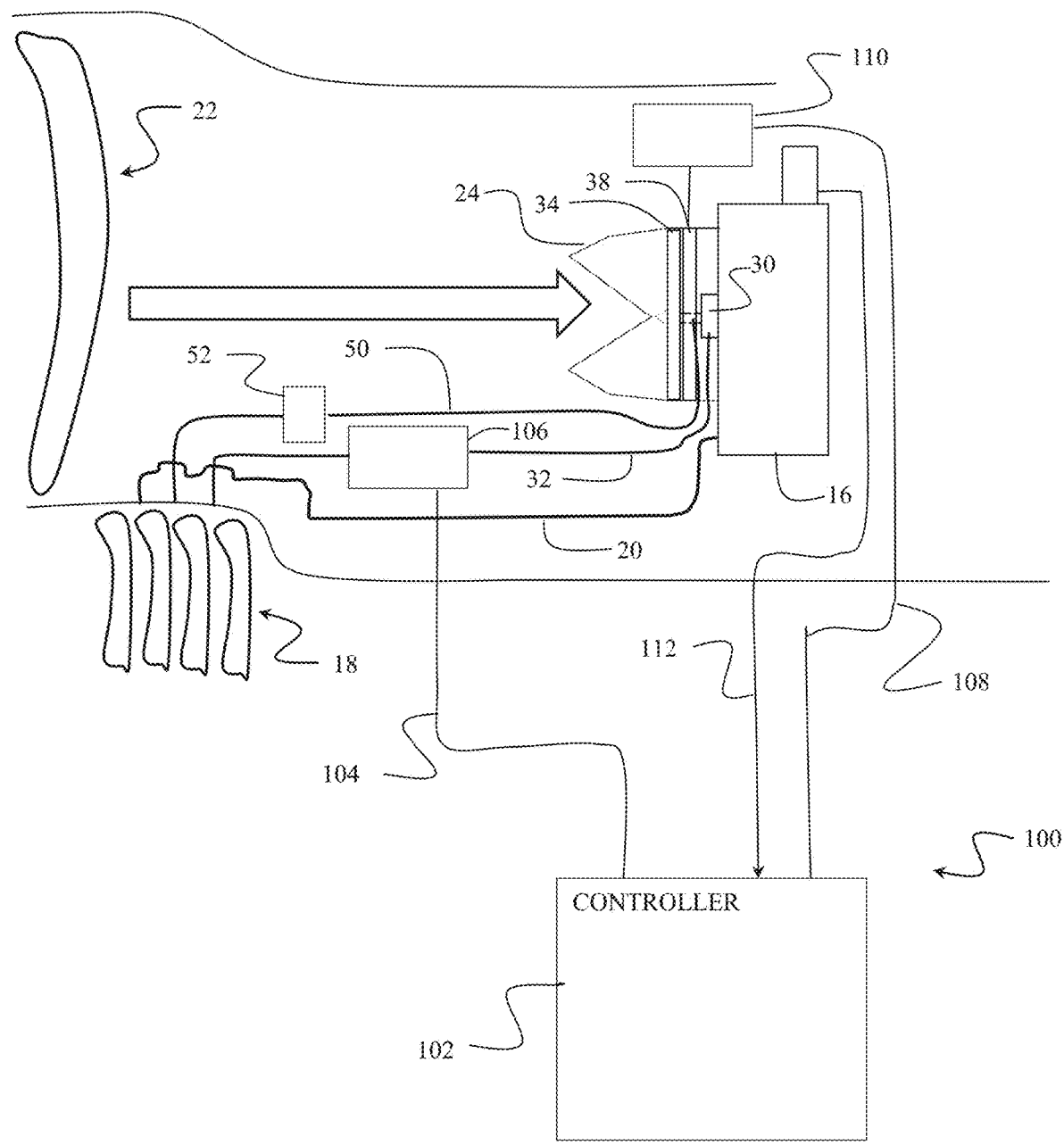
FIG. 8A is a block diagram of a control system for the powered pre-cooler fan assembly.

A control system 100 and general schematic configuration for the powered pre-cooler fan assembly is shown in FIG. 8A. For control of flow through the powered pre-cooler fan assembly 15 or 15', the OGVA 38 can be fully open, fully closed, or set to any position between fully opened and fully closed. The powered pre-cooler fan assembly is typically operable in at least two modes of operation, a first mode in which the pneumatic flow to the turbine 30 is closed and the OGVA 38 controls flow from the inlet plenum 25 to the pre-cooler 16 by adjustment of the variable guide vanes 39 from an open position to a closed position, and a second mode in which pneumatic flow to the turbine 30 is open and the turbine is powering the fan 34. Other modes in which speed of the turbine 30 and fan 34 are controlled over a range of flow rates by adjusting the pneumatic flow and wherein the variable guide vanes 39 are controlled over a range of angles to adjust flow volume are available. In all modes of operation, the fan 34 and OGVA 38 are controlled such that a temperature of the air discharged from the pre-cooler is maintained at a desired predetermined temperature, e.g. 350 degrees F. It should therefore be realized that the configuration of the components in the powered pre-cooler fan assembly 15 will vary based on the outside air temperature, heat load on the system, airspeed of the aircraft 10 and thrust settings of the engine fan 22.

Figure 8B:
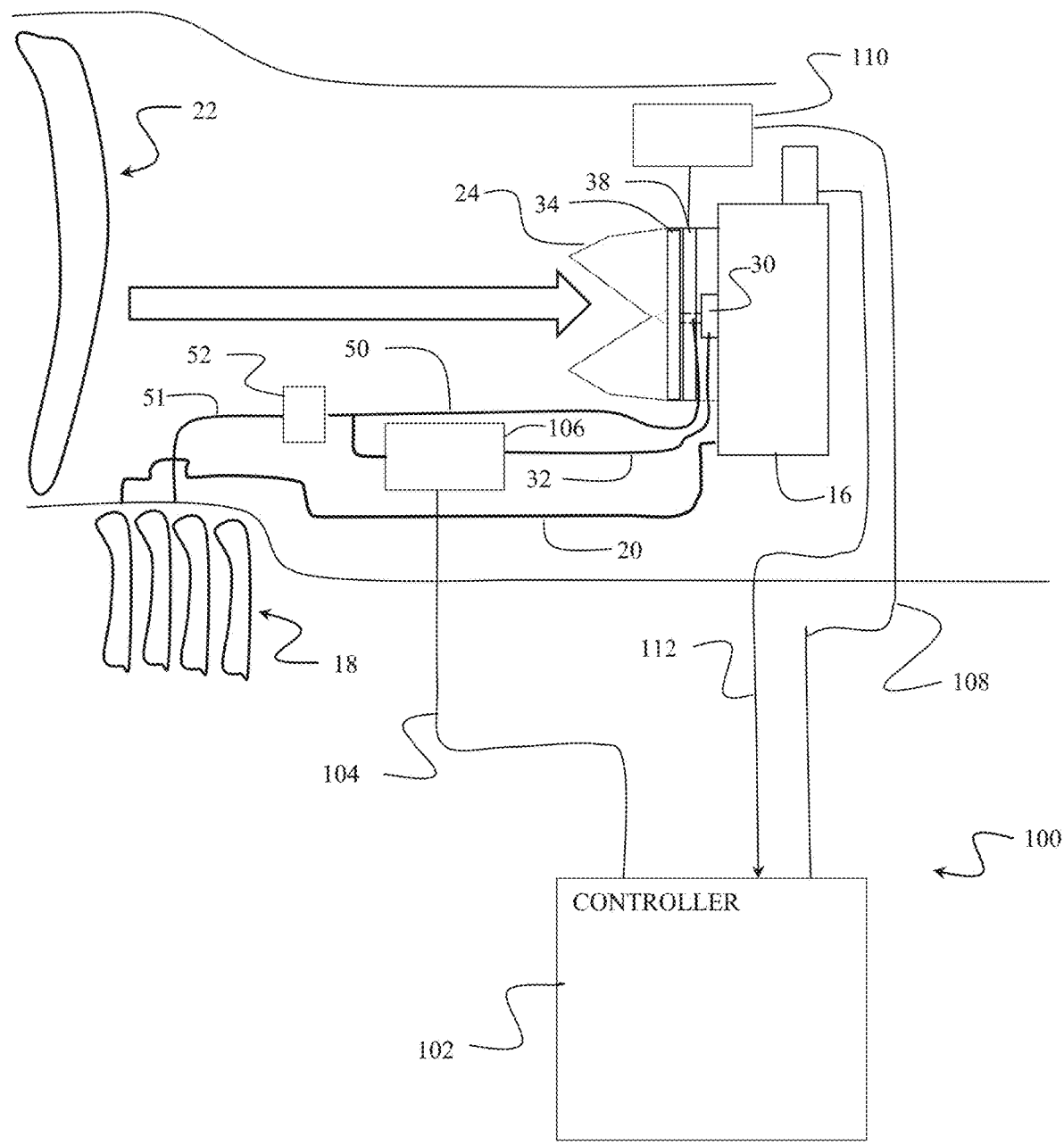
FIG. 8B is the block diagram of the control system with combination of pneumatic turbine supply air and air bearing supply air; and, FIG. 9 is a flow chart of the operation of the implementations for operation of the powered pre-cooler fan assembly

The control system 100 incorporates a controller 102 adapted to provide a fan control signal 104 to a pressure valve 106 controlling flow through the pneumatic pressure supply line 32. Controller 102 is additionally adapted to provide an OGVA position signal 108 to an actuator 110 operatively connected to position the variable guide vanes 39 of the OGVA. The controller 102 is responsive to a temperature signal 112 from a thermocouple or other temperature sensor in the pre-cooler 16. As seen in FIG. 8B, the pneumatic pressure supply line 32 powering the pneumatic turbine 30 and the supply line 50 for the air bearings 48 may be sourced from a single high pressure conduit 51 from the compressor section 18 with cooler 52 providing cooling for air supplying both the turbine inlet volute and the air bearing which may be advantageous for both uses. Bleed air supply through conduit 20 to the pre-cooler will typically be supplied separately from the compressor section 18 but in some cases may also be supplied through the high pressure conduit 51.

In a first mode of operation, bypass air from engine fan 22 is injected into the inlet 24 where the air is directed through the fan 34 and the OGVA 38 as described above. In a first example, outside air temperature is relatively low (cold air) and the heat load on the pre-cooler is low (little heat transfer inside the pre-cooler 16 is required). In this mode operation of the fan 34 may not be required, thus controller 102 will not send the fan control signal 104 to pressure valve 106 which will remain closed. In this mode, the fan 34 would "windmill" (freely rotate in the airstream). The OGVA 38 is adjusted open or closed by OGVA position signal 108, as required responsive to temperature signal 112, to provide as much or as little cooling air to the pre-cooler 16 as is necessary to maintain a temperature of the air discharged from the pre-cooler at the predetermined temperature. Actuation of the OGVA vanes 39 may be accomplished mechanically, hydraulically, pneumatically or electrically by the actuator 110 in response to the OGVA position signal 108.

However, as temperature of the fan bypass air received in the inlet 24 increases or heat load on the pre-cooler 16 increases, the system will reach a point where the operation of the OGVA 38 is no longer sufficient to regulate the temperature of the pre-cooler 16 outlet air. As an example, the OGVA 38 may be fully open, but the temperature of air in the pre-cooler outlet 26 is greater than the predetermined temperature. In this case, referred to as a second mode of operation, the controller 102 responsive to the temperature signal 112 from the pre-cooler 16 may send the fan control signal 104 controllably opening the pressure valve 106 to activate the fan 34. For the third configuration disclosed above, fan control signal 104 may be a direct power signal to the electric motor 60 or may be a control signal to the variable power relay 64 supplying electrical power to the electric motor. In the second mode of operation, the controller 102 operates both the fan 34 and the OGVA 38 to maintain the predetermined temperature. In exemplary implementations, in a general mode of operation the OGVA 38 does not have to be fully open before the fan 34 is activated; rather the controller 102 is configured to operate the fan 34 and the OGVA 38 concurrently to achieve the desired predetermined temperature. As an example, a speed of the fan may be held constant by the fan control signal 104 while the OGVA 38 is adjusted by the OGVA position signal 108 to position the variable guide vanes 39 over a range of positions. Optionally, the OGVA 38 may be maintained as some predetermined position while the speed of the fan 34 is adjusted over a range of flow rates by increasing or decreasing flow through the pressure valve 106 with the fan control signal 104. Further, both the speed of the fan 34 and the position of the OGVA 38 can be adjusted concurrently by the controller 102.

Figure 9:
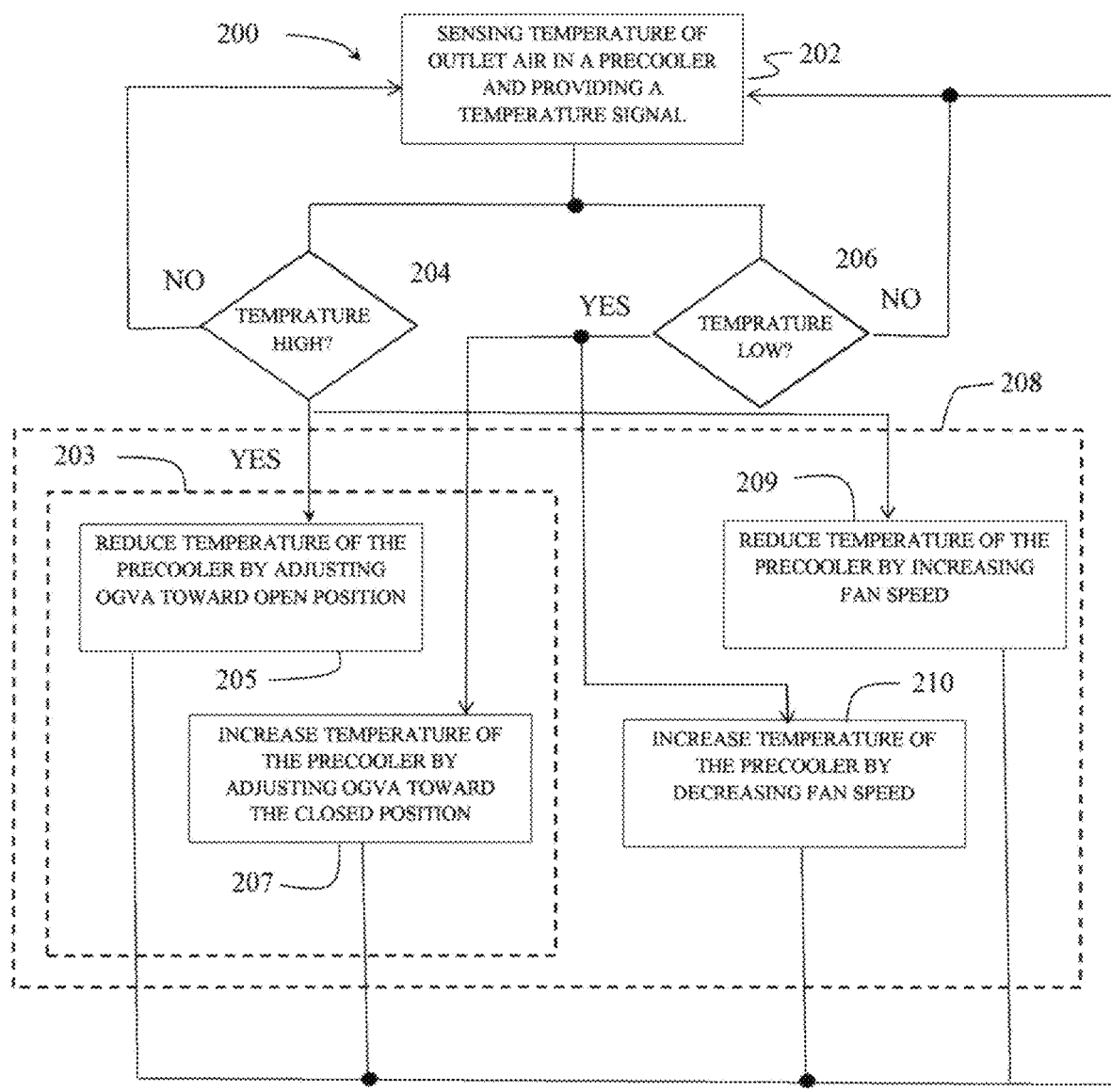

As shown in FIG. 9, the implementations disclosed provide a method 200 for enhancing operation of a pre-cooler 16 having the powered pre-cooler fan assembly 15, 15' or 15" inserted intermediate an inlet plenum 25 and the pre-cooler by sensing temperature of outlet air from the pre-cooler and providing a temperature signal 112 to a controller 102, step 202. In a first mode of operation 203, an OGVA 38 is controlled responsive to the temperature signal in a range between a fully open position and a fully closed position. Responding to a temperature high signal, 204, to reduce temperature of the pre-cooler output by adjusting the OGVA 38 toward the open position, step 205, and to responding to a temperature low signal, 206, to increase temperature by adjusting the OGVA toward the closed position, step 207. In a second mode of operation 208, speed of the fan 34 is additionally controlled, responding to the temperature high signal, 204, by increasing speed of the fan, step 209, to further cool the pre-cooler 16 and responsive to the temperature low signal, 206, by decreasing fan speed, step 210, to increase the temperature in the pre-cooler 16. The controller optimizes between adjustment of the OGVA and speed of the fan to control not only immediate conditions but trending conditions in temperature change.

Having now described various implementations of the disclosure in detail as required by the patent statutes, those skilled in the art will recognize modifications and substitutions to the specific implementations disclosed herein. Such modifications are within the scope and intent of the present disclosure as defined in the following claims.

What is claimed is:

1. A pre-cooler system comprising:
    an inlet plenum adapted to receive bypass engine fan air;
    a powered pre-cooler fan assembly having
        a fan receiving the bypass engine fan air through the inlet plenum;
        an outlet guide vane array (OGVA) adapted to control airflow from the inlet plenum and fan;
        a rotational power source connected to drive the fan; and,
        a shroud adapted to direct airflow from the inlet plenum, fan and OGVA; and,
    a pre-cooler receiving precooling air extracted from bypass flow in the engine fan and provided to the pre-cooler through a re-cooler inlet, the pre-cooler connected downstream of the powered pre-cooler fan assembly receiving airflow from the shroud for heat exchange, and connected through one or more pre-cooler outlets to provide the precooling air to an environmental control system (ECS).

2. The pre-cooler system as defined in claim 1 wherein the rotational power source comprises an electric motor.

3. The pre-cooler system as defined in claim 2 wherein the rotational power source is positioned upstream of the fan or downstream of the fan, the rotational power source is selectively controllable and the OGVA comprises a plurality of variable guide vanes adjustable through a range of positions from an open position to a closed position.

4. A pre-cooler system comprising:
    an inlet plenum adapted to receive bypass engine fan air;
    a powered pre-cooler fan assembly having
        a fan receiving the bypass engine fan air though the inlet plenum; an outlet guide vane array (OGVA) adapted to actively control airflow from the inlet plenum and fan;
        a rotational power source comprising a pneumatic turbine connected to drive the fan; and,
        a shroud adapted to direct airflow from the inlet plenum, fan and OGVA; and,
    a pre-cooler downstream of the powered pre-cooler fan assembly receiving airflow from the shroud.

5. The pre-cooler system as defined in claim 4 wherein the rotational power source is upstream of the fan.

6. The pre-cooler system as defined in claim 4 wherein the rotational power source is downstream of the fan.

7. The pre-cooler system as defined in claim 4 wherein the rotational power source is selectively controllable and the OGVA comprises a plurality of variable guide vanes adjustable through a range of positions from an open position to a closed position.

8. The pre-cooler system as defined in claim 7 further comprising a control system configured to operate the rotational power source and OGVA in at least a first mode and a second mode.

9. The pre-cooler system as defined in claim 8 wherein the control system comprises:
    a controller adapted to provide a fan control signal to a pressure valve controlling flow through a pneumatic supply line connected to the pneumatic turbine, said controller is additionally adapted to provide an OGVA position signal to an actuator operatively connected to position the variable guide vanes of the OGVA, and said controller is responsive to a temperature signal;
    said first mode is characterized wherein the fan control signal closes pneumatic flow to the pneumatic turbine and the OGVA position signal adjusts the variable guide vanes over a range from an open position to a closed position, and
    said second mode is characterized wherein the fan control signal opens the pressure valve providing pneumatic flow to the pneumatic turbine thereby powering the fan.

10. The pre-cooler system as defined in claim 9 wherein the at least a first and second mode further comprises a general mode of operation characterized by the controller concurrently adjusting the fan control signal to operate the fan by increasing or decreasing flow through the pressure valve and adjusting the OGVA position signal to actuate the variable guide vanes over a range of positions to achieve a predetermined temperature responsive to the temperature signal.

11. A powered pre-cooler fan assembly comprising:
    a fan adapted to receive bypass engine fan air through an inlet plenum;
    an outlet guide vane array (OGVA) adapted to control airflow from the inlet plenum and fan;
    a rotational power source comprising a pneumatic turbine operationally connected to the fan; and,
    a shroud adapted to direct airflow from the inlet plenum, fan and OGVA into a pre-cooler disposed downstream of the fan and OGVA.

12. The powered pre-cooler fan assembly as defined in claim 11 wherein the pneumatic turbine comprises a radial inflow turbine having a case with an inlet volute and an outlet diffuser.

13. The powered pre-cooler fan assembly as defined in claim 12 wherein said outlet diffuser entrains outlet flow into the pre-cooler.

14. The powered pre-cooler fan assembly as defined in claim 13 wherein the pneumatic turbine is downstream of the fan.

15. The powered pre-cooler fan assembly as defined in claim 14 wherein outlet flow from the radial inflow turbine is axial.

16. The powered pre-cooler fan assembly as defined in claim 13 wherein the pneumatic turbine is upstream of the fan.

17. A method for enhancing operation of a pre-cooler comprising:
    providing a fan with a rotational power source driving the fan and an outlet guide vane array (OGVA) having variable guide vanes intermediate an inlet plenum and the pre-cooler;
    sensing temperature of outlet air from the pre-cooler and providing a temperature signal to a controller;
    in a first mode of operation, controlling the OGVA responsive to the temperature signal; and
    in a second mode of operation controlling speed of the fan.

18. The method as defined in claim 17 further comprising responding to a temperature high signal to reduce temperature of an output of the pre-cooler, by adjusting the OGVA toward an open position, and responding to a temperature low signal to increase temperature by adjusting the OGVA toward a closed position.

19. The method as defined in claim 18 further comprising:
controlling speed of the fan in response to the temperature high signal by increasing speed of the fan to further cool the pre-cooler and responsive to the temperature low signal by decreasing fan speed to increase the temperature in the pre-cooler.

20. The method as defined in claim 19 further comprising optimizing between adjustment of the OGVA and speed of the fan to control immediate conditions and trending conditions in temperature change.

\* \* \* \* \*